United States Patent
Neff et al.

(10) Patent No.: US 7,722,279 B2
(45) Date of Patent: May 25, 2010

(54) UNIVERSAL INSERT

(75) Inventors: Todd Michael Neff, Salem, VA (US); Raymond Aguero, Roanoke, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 141 days.

(21) Appl. No.: 11/944,928

(22) Filed: Nov. 26, 2007

(65) Prior Publication Data
US 2009/0137148 A1    May 28, 2009

(51) Int. Cl.
*B25G 3/00* (2006.01)
(52) U.S. Cl. .......................................... 403/13; 403/14
(58) Field of Classification Search ............... 403/115, 403/13, 14, 109.3, 144; 2/6.2, 422
See application file for complete search history.

(56) References Cited

U.S. PATENT DOCUMENTS

| | | | |
|---|---|---|---|
| 3,124,238 A * | 3/1964 | Tyler | ........................... 198/827 |
| 4,611,883 A * | 9/1986 | Myer | ........................... 385/14 |
| 5,176,342 A | 1/1993 | Schmidt et al. | |
| 5,367,402 A | 11/1994 | Holmes et al. | |
| 5,467,479 A | 11/1995 | Mattes | |
| 5,471,678 A | 12/1995 | Dor | |
| 5,506,730 A | 4/1996 | Morley et al. | |
| 5,542,627 A | 8/1996 | Crenshaw et al. | |
| 5,914,816 A | 6/1999 | Soto et al. | |
| 6,081,094 A | 6/2000 | Crenshaw et al. | |
| 6,457,179 B1 | 10/2002 | Prendergast | |
| 6,472,776 B1 | 10/2002 | Soto et al. | |
| 6,662,370 B1 | 12/2003 | Buchanan, Jr. | |
| 6,751,810 B1 | 6/2004 | Prendergast | |
| 6,862,748 B2 | 3/2005 | Prendergast | |
| 6,938,276 B1 | 9/2005 | Prendergast | |
| 6,957,449 B2 | 10/2005 | Prendergast | |
| 2005/0013658 A1* | 1/2005 | Muders et al. | ............... 403/122 |

* cited by examiner

*Primary Examiner*—Victor MacArthur
(74) *Attorney, Agent, or Firm*—RatnerPrestia

(57) ABSTRACT

A molded plastic insert having a socket and groove formed on an outer surface to cooperate with spring loaded plungers on one of a pair of mating parts to couple the mating parts. A pair of indentations formed on the outer edge of the insert to accommodate any electrical leads between the mating parts.

1 Claim, 3 Drawing Sheets

UNIVERSAL INSERT

STATEMENT REGARDING FEDERALLY SPONSORED RESEARCH

This invention was made under U.S. Government Contract No. PAN/05/0201/06 and the U.S. Government may have certain rights in this invention.

CROSS-REFERENCE TO A RELATED APPLICATION

This invention is related to and incorporates by reference Ser. No. 11/944,942 entitled Helmet Mount for Night Vision Goggles filed concurrently herewith by Todd Michael Neff et al. and assigned to the assignee of this application.

Field of the Invention

This invention relates to a universal insert used for coupling a plurality of optical components to each other and also for coupling the assembled optical components to a support.

Background of the Invention

Various optical assemblies are made up of a plurality of optical components coupled together to form an assembly that is coupled to a support. For example, night vision apparatus is commonly used by aviators to enhance their visibility while flying during night or other low light conditions. Conventional night vision apparatus comprises a night vision goggle including image intensifier tubes, lens assemblies and a complex mounting assembly that provides for numerous adjustments of the goggle position with respect to the user. Such apparatus also includes a relatively light weight power pack that houses a battery or batteries and a circuit board. The power pack is mechanically and electrically coupled to the goggle for operating the goggle and the power pack is, in turn, coupled to the aviators' helmet.

In the night vision apparatus example, the coupling arrangement between the power pack and the goggle and the coupling between the power pack and the aviators helmet utilize similar spring loaded plungers and sockets to effect releasable couplings. Four such plungers and four such sockets are used, two on, e.g., the right side and two on the left side.

Two of the plungers and a socket on the right side and a socket on the left side the sides are used to couple the power pack and the goggle. The other two plungers and the other two sockets are used to couple the power pack and its support. The sockets used to couple the power pack and the goggle are required to accommodate the electrical connection between the power pack and the goggle.

Thus, four distinct socket arrangements are needed to effect the couplings noted above and this requires the expense of making and inventorying four parts. Accordingly, it is desirable to have a universal insert that can be used to provide the four sockets.

SUMMARY OF THE INVENTION

This invention includes an insert having a bottom surface and an opposite outer surface. The outer surface is formed with a socket and a groove extending from the socket to the outer edge of the insert. A pair of spaced apart indentations are formed on the outer edge of the insert.

When the insert is fixed to a support having an electrical contact, the contact extends from the support through one of the indentations.

BRIEF DESCRIPTION OF THE DRAWINGS

For a better understanding of the invention, reference is made to the following description of an exemplary embodiment thereof, considered in conjunction with the accompanying drawings, in which.

DETAILED DESCRIPTION OF THE INVENTION

Figure 1:
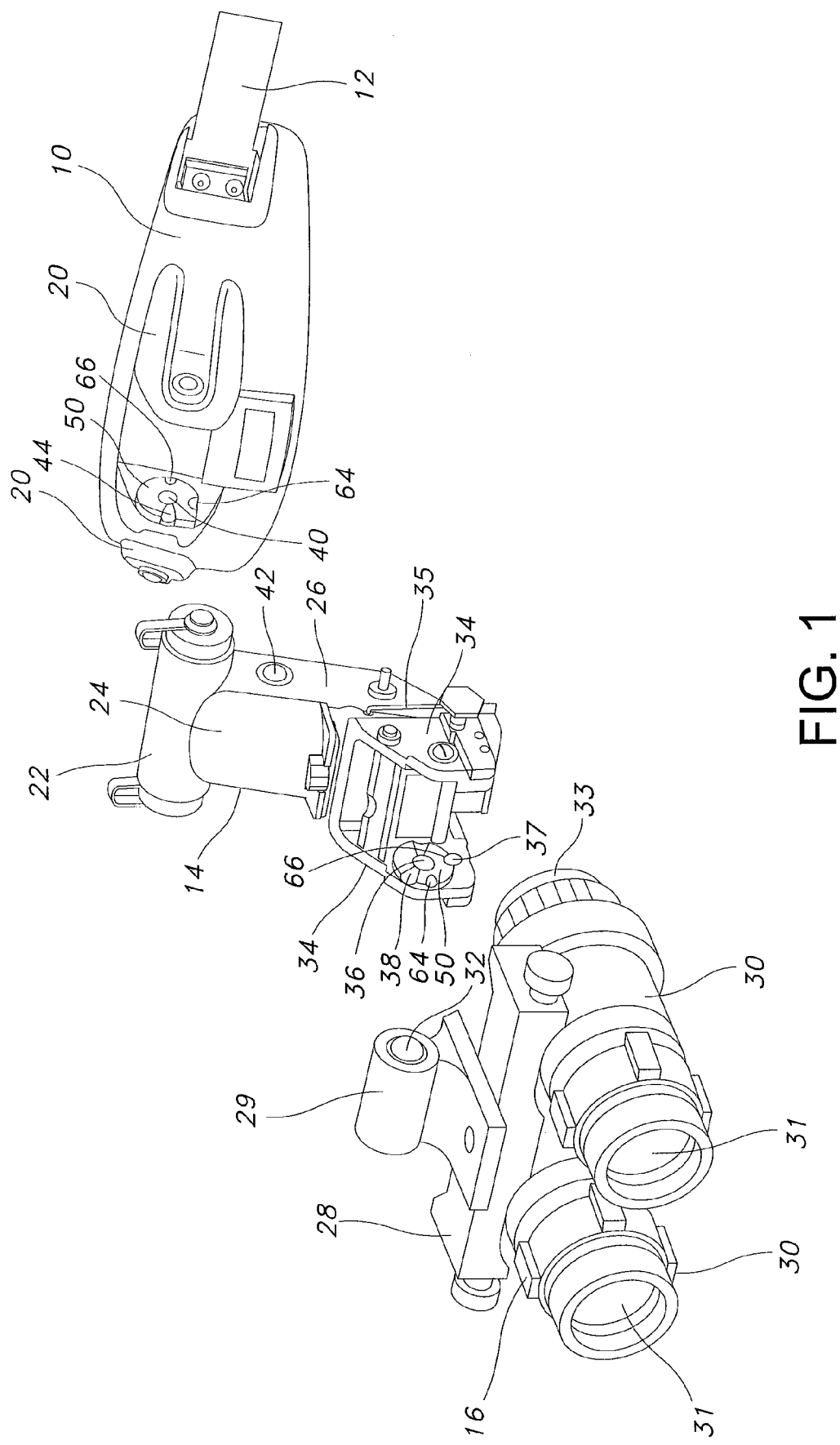
FIG. 1 is an exploded perspective view illustrating a support band and night vision apparatus.

Referring to FIG. 1 there is shown an exemplary assembly of optical components using an insert in accordance with this invention. The exemplary assembly is a night vision apparatus adapted to be mounted to an aviator's helmet. Described is a support band 10 made of plastic or other suitable material. The support band 10 has an inner surface configured to seat on the front surface of a helmet, and one of a pair of mechanical fastener assembly components 12 used to secure the band to an aviator's helmet. Such fastener assemblies are well known in the art. As illustrated in FIG. 1, the component 12 functions as an over the center clamp that cooperates with sockets on the helmet to fix the support band 10 to the aviator's helmet. It is understood that the fastener assembly could be a screw arrangement or a harness arrangement or any other suitable arrangement.

Still referring to FIG. 1, there is also shown a power pack 14 which, as will be made clear hereinafter, is releasably coupled to the support band 10 and a night vision goggle 16 which is releasably coupled to the power pack so that the power pack can be coupled and uncoupled to the support band and the goggle can be coupled and uncoupled to the power pack without the use of tools. The goggle 16 and the power pack 14 are electrically connected so that the power pack operates the goggle. As will also be made clear hereinafter, the releasable couplings between the power pack 14 and the support band 10 and between the power pack and the goggle 16 are configured so that the power pack and the goggles are released simultaneously, preferably as a unit, from the aviator's helmet when a predetermined g-force acts on the aviator.

The power pack 14 includes a battery compartment 22 preferably molded from plastic or other suitable material. The battery compartment 22 is sized and shaped to receive a standard alkaline double AA battery or an L9 lithium battery or other usable battery. Alternatively, the battery compartment may be configured to receive two or more batteries. As is usual, the battery compartment 22 includes battery contacts and electric leads to connect the battery to a printed circuit board which also includes the necessary electric leads and contacts 37, 37 for electrically coupling the printed circuit board to the goggle 16. To accommodate the circuit board, its leads and contacts, the power pack 14 further includes a second compartment also molded from plastic or other suitable material and formed by a front wall 24, a pair of side walls 26 (only one of which is shown) and a back wall (not shown). This second compartment includes a support arrangement to mount the printed circuit board as well as leads and contacts that connect from the battery to the printed circuit board and from the circuit board to the goggle 16.

The night vision goggle 16 can be any such device that receives low level light and intensifies that light to present a viewable image to its user. In the exemplary embodiment shown here, the goggle 16 includes a pair of monoculars 30, 30 of any conventional type. In the alternative a single monocular can be used. Each of the monoculars 30 includes an objective lens 31 that receives low level ambient light and each includes an image intensification tube that intensifies the light and presents a visible images to an eye piece 33 at the end of the monocular opposite the objective lens.

The goggle 16 is carried by adjustable mounting assembly 28, that provides for adjustment of the goggle relative to the aviator. Such assembly may include a flip up mount that allows the goggle 16 to rotate between an operative position in front of the aviators eyes and an inoperative position located adjacent the front of the helmet and above the aviators eyes. As is well known in the art, such adjustable mount assemblies usually include complex adjustment mechanisms for adjusting the goggle's horizontal distance relative to the aviator as well as its tilt and focus, and the interpupillary distance between the monoculars.

The adjustable mount assembly 28 and thus the goggle 16 are coupled to the power pack 14 via a mounting receptacle 35. The receptacle 35 is formed with a pair of spaced apart ears 34, 34 which are generally parallel to the side walls 26, 26 of the second compartment 14. Each ear 34 accommodates an electrical lead 37 which connects the power pack 14 to the goggle 16. Each ear 34 further contains a socket 36 on its inner surface, that is, the surface that faces the adjacent surface of the other ear. In the exemplary embodiment disclosed herein, each socket 36 is in the form of a generally spherical depression, but it could be in the form of a through hole, a bore-counter-bore configuration or a variety of other configurations known in the art.

The adjustable mount assembly 28 includes a housing portion 29 which carries a spring loaded plunger arrangement including a compression spring biasing a pair of plungers 32, 32 (only one of which is shown) outwardly of the end walls of the compartment 29. These plungers 32, 32 can be balls or are otherwise formed with spherical end surfaces that are inserted into the sockets 36, 36 to retain the adjustable mount assembly and binocular 16 on the receptacle 35. The spherical ends of the plunger 32, 32 can also rotate in the sockets 36, 36 to provide for the rotation of the goggle 16 between its operative and inoperative positions.

The sockets 36, 36 and their below described grooves 38, 38 are advantageously formed in inserts 50 carried on the ears.

Figure 2:
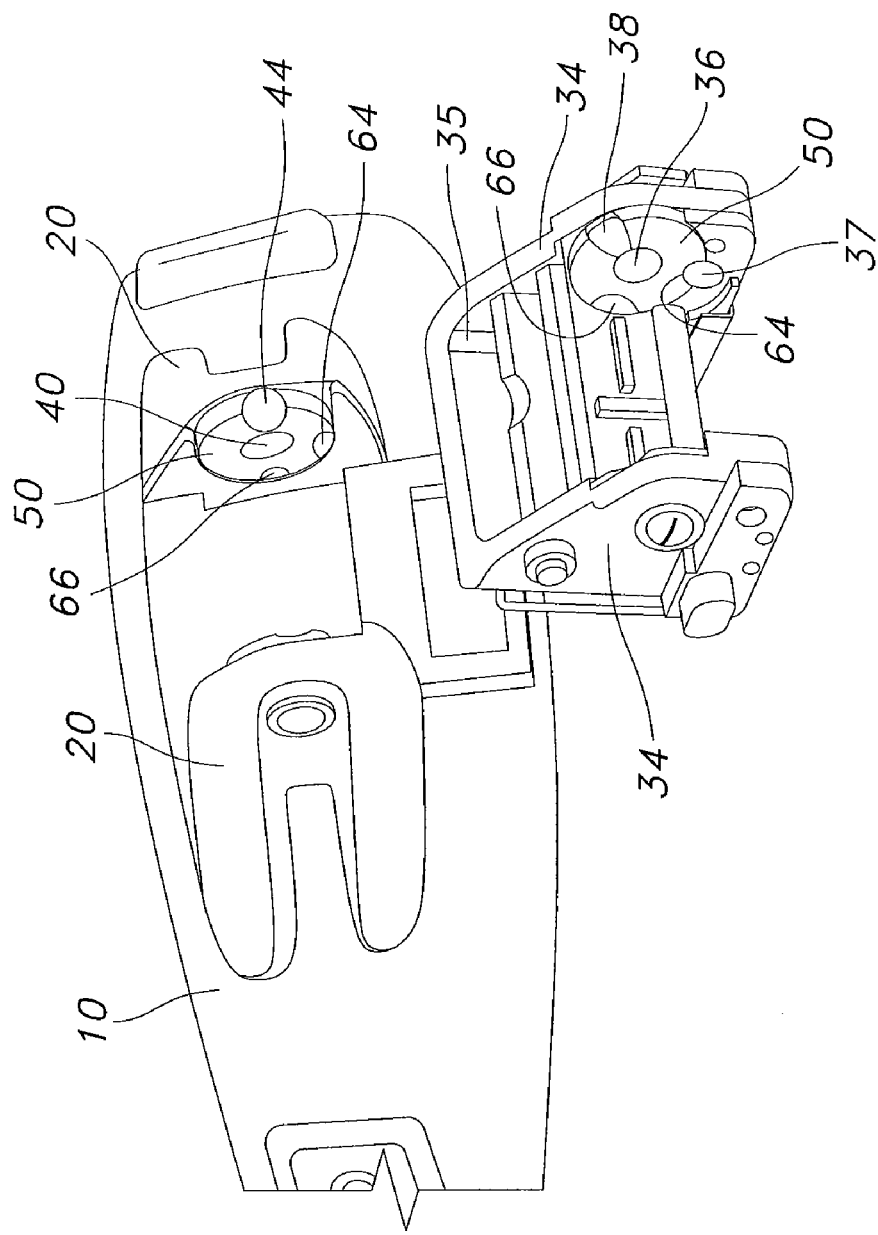
FIG. 2 is another perspective view showing the support band and part of the goggle mount juxtaposed to show the relative orientation of the grooves in each.

As see in FIGS. 1 and 2, the sockets 36, 36 communicate with the outer edge of the ears 34, 34 via tapered grooves 38, 38. The largest arc length of the tapered grooves is open and is located adjacent the outer edge of the ears 34, 34 and the narrowest arc length is located adjacent the sockets 36, 36. The bottom surfaces of the grooves 38, 38 can be in the form of a ramp that inclines inwardly from the outer edge of the ears 34, 34 to the sockets 36, 36 so that the distance between the grooves decreases as the grooves approach the sockets.

To couple the night vision binoculars to the adjustable mounting assembly, the spring loaded plungers 32, 32 are inserted into the open end of the grooves 38, 38 adjacent the outer edge of the ears 34, 34 and are pushed along the grooves so that the ramped bottom surfaces compresses the plungers until the spring loaded plungers expand into the sockets 36, 36. When the plungers 32, 32 spring into the sockets 36, 36, the night vision goggle 16 and its mount assembly 28 are releasably and rotatably coupled to the mounting receptacle 35. To remove the goggle 16 from the receptacle 35, the goggle is pulled with sufficient force so that the concave wall of the sockets 36, 36 compresses the plungers 32, 32 and the plungers ride along the grooves 38, 38 until the goggle is free of the receptacle.

The outer surface of the support band 10 is formed with a pair of ears 20, 20, which are spaced apart from each other and which extend in the forward direction. Each ear 20, 20 also contains sockets 40, 40 on the surface of the ear that faces the adjacent surface of the other ear. These sockets 40, 40 are also in the form of generally spherical depressions that cooperate with spring loaded plungers 42, 42 carried on the power pack 14 to releasably couple the power pack 14 to the support band 10. As best seen in FIG. 1, the plungers 42, 42 are carried in the power pack's second compartment and extend through the side walls 26, 26 thereof. As with the previously described plungers 32, 32, the plungers 42, 42 can be balls or are otherwise formed with spherical end surfaces Each socket 40 also communicates with a groove 44. These grooves 44, 44 are tapered and ramped similar to the taper and ramp described with respect to grooves 38, 38. Thus, each groove 44 has an open end adjacent the outer edge of its associated ear 20 and this open end has a larger arc length than the end of the groove adjacent its associated socket 40; and, the bottom surface of each groove inclines inwardly from the outer edge of its associated ear to its associated socket so that the distance between the grooves decreases as the grooves approach the sockets.

As will be explained the sockets 40, 40 and grooves 44, 44 are provided by the inserts 50.

The power pack 14 is coupled to the support band 10 by inserting the spring loaded plungers 42, 42 into the open end of the grooves 44, 44 and pushing the power pack so that the plungers ride along the grooves and expand into the sockets 40, 40 to releasably couple the power pack to the support band 10. Removal of the power pack 14 is accomplished by pulling the power pack in the forward direction so that the plungers 42, 42 are compressed and ride out of the sockets 40, 40 and along the grooves 44, 44 until the power pack is free of the support band 10.

As noted above, the goggle 16 is relatively heavy and the power pack 14 is relatively light. As a consequence the forces acting during an ejection could release the goggle 16 from the power pack 14 before the power pack is released from the support band 10. If the goggle 16 releases from the power pack 14 before the power pack releases from the support band 10, the power pack lacks sufficient weight to assure that it will separate from the support band.

Referring specifically to FIG. 2, the support band 10 and the mounting assembly 28 are shown juxtaposed next to each other in a position of use. It can be seen that the grooves 44, 44 extend in the generally forward direction and that the grooves 38, 38 extend upwardly at an angle to the forward direction. The axis of the grooves 38, 38 thus forms an angle with the axis of the grooves 44, 44. In the embodiment disclosed herein, the angle is about 45°, but other angles can be used. This angular arrangement helps to assure that both the power pack 14 and the goggle 16 are released as a single unit from the support band 10 when the pilot ejects from the aircraft. Moreover, the upward angle of the grooves 44, 44 assures that the power pack 14 and goggles 16 are ejected from the helmet in an upward and outward direction and do not impact against the aviator or fall into his/her lap.

In actual use the spring load between the plungers 42, 42 and the sockets 40, 40 is such that the power pack 14 and goggles 16 release from the support band 10 at a predetermined g-force, e.g., at least about 9 gs and preferably at about 11 gs.

Figure 3:
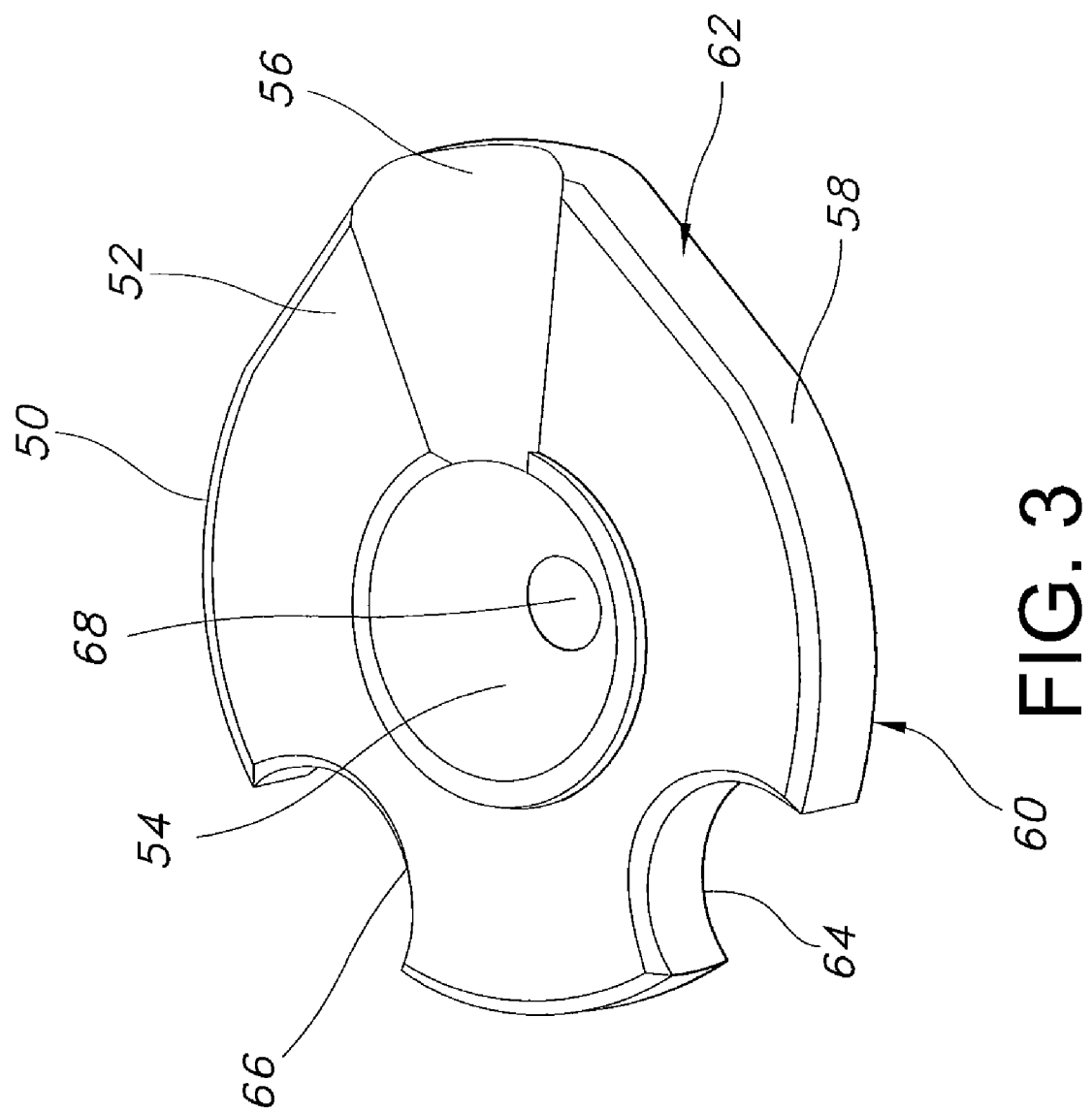
FIG. 3 is a perspective view of an insert usable with the invention.

Referring to FIG. 3, the insert 50 is an injection molded plastic part. The insert is shaped to fit into and be carried in a bore formed in the ears 34, 34 and 20, 20. Of course, these bores must all have the same configuration so that insert 50 can fit in any one of the bores. The insert 50 has a flat bottom surface (not shown) that sits on the bottom surface of the bores formed in the ears.

The insert 50 has an outer surface 52 opposite the bottom surface and this surface 52 is formed with a spherical depression 54 that functions as the sockets 36 and 40 described above. Extending radially from the spherical depression 54 is a groove 56 that functions as the grooves 38 and 44 describe above. The groove 56 is thus tapered along its length having a larger arc length at the outer edge 58 of the insert 50 and a smaller arc length where it communicates with the spherical depression 54.

The bottom surface of the groove 56 is inclined to form the ramp described above. Thus, the depth of the groove 54 is greater at the outer edge 58 than at the depression 54 so that the distance between the outer surface 52 and the bottom of the groove 56 is greater at the edge than at the spherical depression 54.

Still referring to FIG. 3, the insert, in plan view, includes a generally circular section 60 and a somewhat elliptical section 62. The elliptical section 62 is sized to accommodate the groove 56.

It should be understood that the spherical depression 54 functions when inserted in the ears 20, 20, 34 and 34 as the sockets 36, 36, 40 and 40 and the grooves 56 function as the grooves 38, 38, 44 and 44 as previously described.

In the generally circular section 60, the outer edge 58 of the insert 50 is formed with spaced apart, generally accurate indentations 64 and 66. As will be explained hereinafter, these indentations 64 and 66 accommodate the electrical lead 37 between the power pack 14 and the goggle 16 when the insert is used in the ears 36, 36.

Finally, the insert 50 is formed with a hole 68 in the bottom of the spherical depression 54 to fix the insert on its associated ear. The hole 68 may be internally threaded to cooperate with a screw to fix the insert 50 in the bores on the ears 20, 20, 34 and 34.

The insert 50, as best seen in FIG. 2 can fit in any one of the ears 34, 34, 20 or 20. When inserted into the ears 20, 20, the insert is oriented so that the grooves 54 extend forwardly. When inserted into the ear 34 on the left side of the assembly, the indentation 64 is located adjacent the electrical lead 37 extending through the side wall of the ear; and when inserted into the ear 34 on the right side of the assembly, the indentation 66 is located adjacent the electrical lead (not shown) extending through the other side wall of the ear. The inserts are oriented so that the grooves extend in the previously described upward direction.

Thus, it can be seen that the insert 50 is a low cost piece that can be used in any one of the ears 20, 20, 34 or 34. By virtue of this universal applicability, only a single part need be made and inventoried.

While in the foregoing there has been disclosed an exemplary embodiment of the invention, it should be understood that the scope of the invention is set forth in the appended claims.

What is claimed:

1. A molded plastic insert that is configured to mate with a spring loaded plunger, said insert comprising a flat bottom surface, a top surface that is opposite the bottom surface, and a perimeter surface extending between the bottom surface and the top surface, said perimeter surface of said insert defining a generally circular section and a generally elliptical section, a generally spherical depression located on the top surface in the circular section of said insert and a groove located on the top surface in the generally elliptical section extending from the generally spherical depression to the perimeter surface of the generally elliptical section, the groove tapering from a larger dimension adjacent the perimeter surface to a smaller dimension adjacent the generally spherical depression, a depth of the groove being greater at the perimeter surface than at the generally spherical depression, a through hole extending from the generally spherical depression to the flat bottom surface, and a pair of spaced apart generally arcuate indentations formed in the circular section on the perimeter surface.

* * * * *